United States Patent [19]

Kondo et al.

[11] Patent Number: 4,834,700
[45] Date of Patent: May 30, 1989

[54] METHOD OF AND APPARATUS FOR FORMING FILTER ELEMENT

[75] Inventors: Naohiko Kondo, Okazaki; Mineo Hanai, Aichi; Yoshiaki Miyagawa, Gifu; Ikuo Mochizuki, Handa; Yuji Ito, Kariya; Takatoshi Iwase, Anjo, all of Japan

[73] Assignee: Nippondenso Co., Ltd., Kariya, Japan

[21] Appl. No.: 80,009

[22] Filed: Jul. 31, 1987

[30] Foreign Application Priority Data

Aug. 20, 1986 [JP] Japan .................. 61-194489

[51] Int. Cl.⁴ .................................... B31F 1/20
[52] U.S. Cl. ........................... 493/463; 493/456; 493/457; 493/470; 493/941; 264/324
[58] Field of Search ............ 493/341, 395, 406, 409, 493/449, 451, 454, 456, 457, 463, 470, 940, 941; 264/325, 324, 345

[56] References Cited

U.S. PATENT DOCUMENTS

| | | | |
|---|---|---|---|
| 1,989,015 | 1/1935 | McKellip | 264/324 |
| 2,531,555 | 11/1950 | Cummings et al. | 493/941 |
| 4,098,177 | 7/1978 | Olney et al. | 493/353 |
| 4,246,223 | 1/1981 | Patterson | 264/325 |
| 4,502,315 | 3/1985 | Dubrovsky et al. | 72/385 |
| 4,718,884 | 1/1988 | Iwase et al. | 493/451 |

FOREIGN PATENT DOCUMENTS

| | | |
|---|---|---|
| 0058994 | 9/1982 | European Pat. Off. |
| 0200798 | 11/1986 | European Pat. Off. |
| 2158667 | 6/1973 | France |
| 59-36515 | 2/1984 | Japan |
| 60-174218 | 9/1985 | Japan |
| 60-225615 | 11/1985 | Japan |
| 61-161113 | 7/1986 | Japan |
| 2125707 | 3/1984 | United Kingdom |

Primary Examiner—Frederick R. Schmidt
Assistant Examiner—Robert Showalter
Attorney, Agent, or Firm—Cushman, Darby & Cushman

[57] ABSTRACT

A ring-shaped corrugated filter element blank having radially alternate peak and valley folds is placed on a first mold having as many first concentric projections as the number of the peak folds of the ring-shaped blank and as many first concentric grooves as the number of the valley folds of the ring-shaped blank, with the peak folds fitted respectively over the first projections and the valley folds fitted respectively in the first grooves. Then, the ring-shaped blank is pressed between the first mold and a second mold, the second mold having second projections lying along concentric lines fitting respectively in the first grooves with the valley folds received therein, and second concentric grooves receiving respectively the first projections with the peak folds fitted thereover. The ring-shaped blank is heated while it is being pressed between the first and second molds, thereby forming a ring-shaped filter element. Thereafter, the ring-shaped filter element is cooled.

16 Claims, 9 Drawing Sheets

METHOD OF AND APPARATUS FOR FORMING FILTER ELEMENT

BACKGROUND OF THE INVENTION

The present invention relates to the formation of a filter element, and more particularly to a method of and an apparatus for forming a filter element by pressing heated molds against the peak and valley folds of a ring-shaped corrugated blank and then cooling the blank to shape the same to true circular concentric configuration.

Filter elements are manufactured by cutting off a sheet of filter element material to a sector-shaped blank, folding the blank into a corrugated structure having alternate peak and valley folds creased along arcuate lines, and forcibly bringing the opposite edges of the corrugated sectorial blank into abutment against each other to form a ring-shaped filter element.

The filter element material is usually composed of a stack of a dense layer, an intermediate layer, and a coarse layer which are bonded together. The dense layer is made of material fibers closely massed and intertwined together which are highly resistant to becoming loose under tension and not stretchable enough to absorb strains produced when the filter blank is folded. Therefore, when the blank is forcibly brought into the ring shape, the peak and valley folds tend to produce angular edges, rather than being trued into concentric relation. The filter element blank with such angular edges on the folds or creases presents difficulty in automatic production of filter elements. More specifically, a filter element blank may not smoothly and stably be set on molds when it is to be shaped by the molds while being impregnated with resin, and a filter element blank may be ruptured when the molds are pressed against each other.

One solution to the above problems is disclosed in Japanese Laid-Open Patent Publication No. 59-36515 published Feb. 28, 1984. According to the disclosed proposal, a jig has concentric ridges corresponding to the peak folds of a ring-shaped folded filter element blank. The ring-shaped blank which is placed on the jig is heated at about 120° C. for about 30 minutes. The disclosed arrangement does not however lend itself to mass production of filter elements since it requires many jigs and heating devices, and a long period of time is required to heat filter element blanks.

SUMMARY OF THE INVENTION

It is an object of the present invention to provide a method of forming a filter element while shaping a ring-shaped element blank with angularly bent edges to a desired true concentric configuration within a short period of time.

Another object of the present invention is to provide an apparatus for carrying out the above filter element forming method.

According to the present invention, there is provided a method of forming a filter element, comprising the steps of: providing a ring-shaped corrugated filter element blank having radially alternate peak and valley folds; placing the ring-shaped blank on a first mold having as many first concentric projections as the number of the peak folds of the ring-shaped blank and as many first concentric grooves as the number of the valley folds of the ring-shaped blank, with the peak folds fitted respectively over the first projections and the valley folds fitted respectively in the first grooves; pressing the ring-shaped blank between the first mold and a second mold, the second mold having second projections lying along concentric lines for fitting respectively in the first grooves with the valley folds received therein, and second concentric grooves for receiving respectively the first projections with the peak folds fitted thereover; heating the ring-shaped blank while it is being pressed between the first and second molds, thereby forming a ring-shaped filter element; and thereafter, cooling the ring-shaped filter element.

According to the present invention, there is also provided an apparatus for forming a filter element, comprising: a first mold having first concentric projections and first concentric grooves, the first projections and grooves being alternately arranged; a second mold having second projections lying along concentric lines and positioned in alignment with the first grooves, respectively, and second concentric grooves positioned in alignment with the first projections, respectively, the second projections and grooves being alternately arranged; moving means for moving the first and second molds relatively to each other to bring the first projections into and out of the second grooves and also to bring the second projections into and out of the first grooves; and heater means for heating one of the first and second molds.

BRIEF DESCRIPTION OF THE DRAWINGS

The present invention will be described in detail by way of illustrative example with reference to the accompanying drawings, in which.

DETAILED DESCRIPTION

Figure 8:
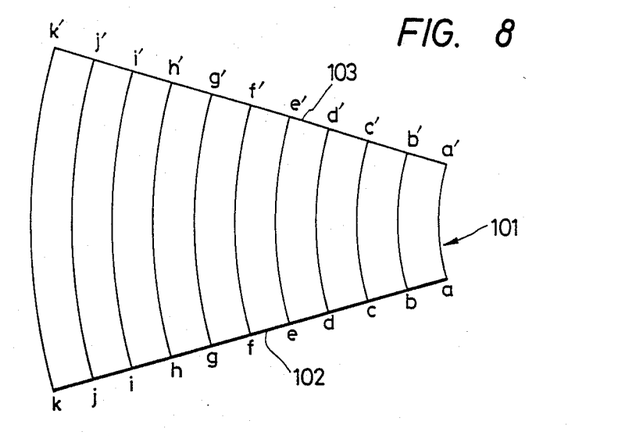
FIG. 8 is a plan view of a filter element blank cut off from a filter element material sheet.
Figure 9:
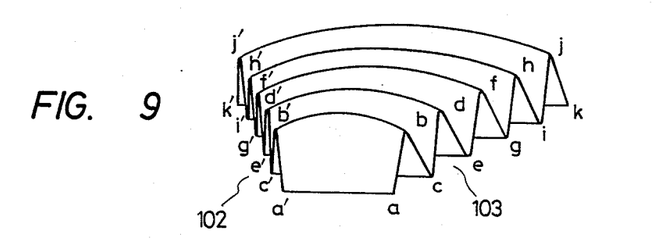
FIG. 9 is a perspective view of the filter element blank which has been creased or corrugated along arcuate lines.
Figure 10:
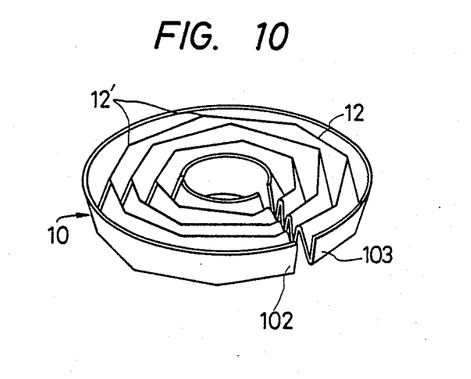
FIG. 10 is a perspective view of the filter element blank with its opposite edges brought together into a ring shape.
Figure 11:
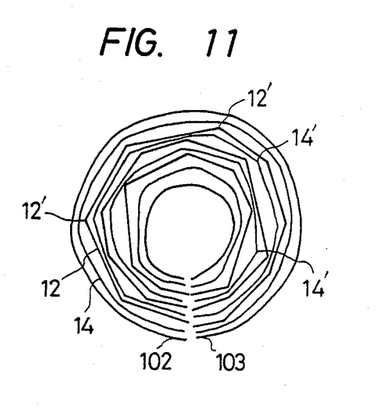
FIG. 11 is a plan view of the ring-shaped filter element blank.

As shown in FIG. 8, a flat filter element blank 101 of a sectorial shape is cut off from a filter element material sheet (not shown). The sector-shaped blank 101 is then creased or corrugated along spaced arcuate lines b-b', c-c', . . . j-j' of the sectorial shape to form alternate peak and valley folds successively arranged from one end a-a' to the other end k-k' as shown in FIG. 9. The blank 101 is thereafter curved in its entirety with the end a-a' located inside and the end k-k' outside until opposite ends 102, 103 are brought together thereby to form a ring shape, as illustrated in FIG. 10. As shown in FIGS. 10 and 11, the ring-shaped blank, denoted at 10, has peak folds 12 and valley folds 14 which are angularly bent at 12', 14' in several circumferentially spaced locations.

Figure 1:
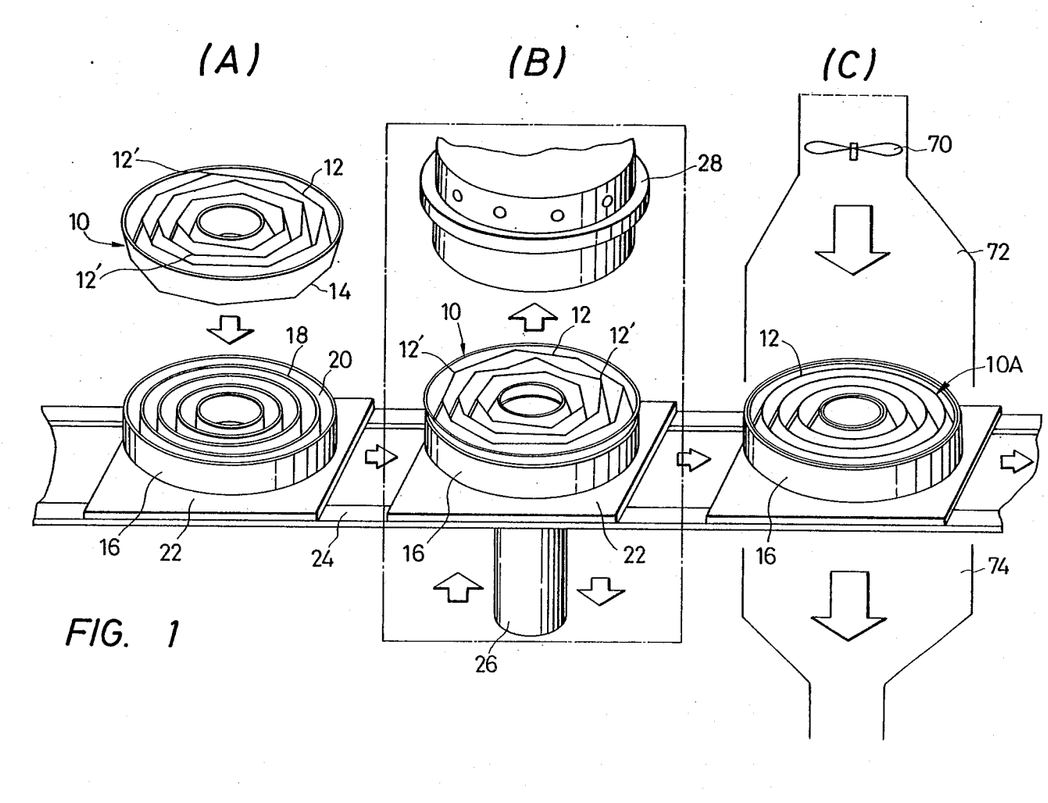
FIG. 1 is a perspective view showing successive processing steps for forming a filter element according to the present invention.

FIG. 1 shows successive steps of shaping the ring-shaped filter element blank 10 into a filter element. The opposite ends 102, 102 of the filter element blank 10 are omitted from illustration in FIG. 1.

The ring-shaped blank 10 is shaped by a mold assembly comprising a lower mold 16 and an upper mold 28. The lower mold 16 is of a circular shape having a plurality of as many concentric projections or fins 18 as the number of the peak folds 12 of the ring-shaped blank 10, and a plurality of valleys or grooves 20 defined between the fins 18. The lower mold 16 is carried by a pallet 22 placed on a conveyor 24. The ring-shaped blank 10 is mounted on the lower mold 16 in a position (A) in FIG. 1.

The ring-shaped blank 10 mounted on the lower mold 16 is fed by the conveyor 24 from the position (A) to a shaping station in a position (B). A lifter cylinder 26 is disposed in the shaping station for elevating the lower mold 16. The upper mold 28 is located in the shaping station above the lower mold 16. The lower mold 16 lifted by the lifter cylinder 26 is pressed against the upper mold 28.

Figure 2:
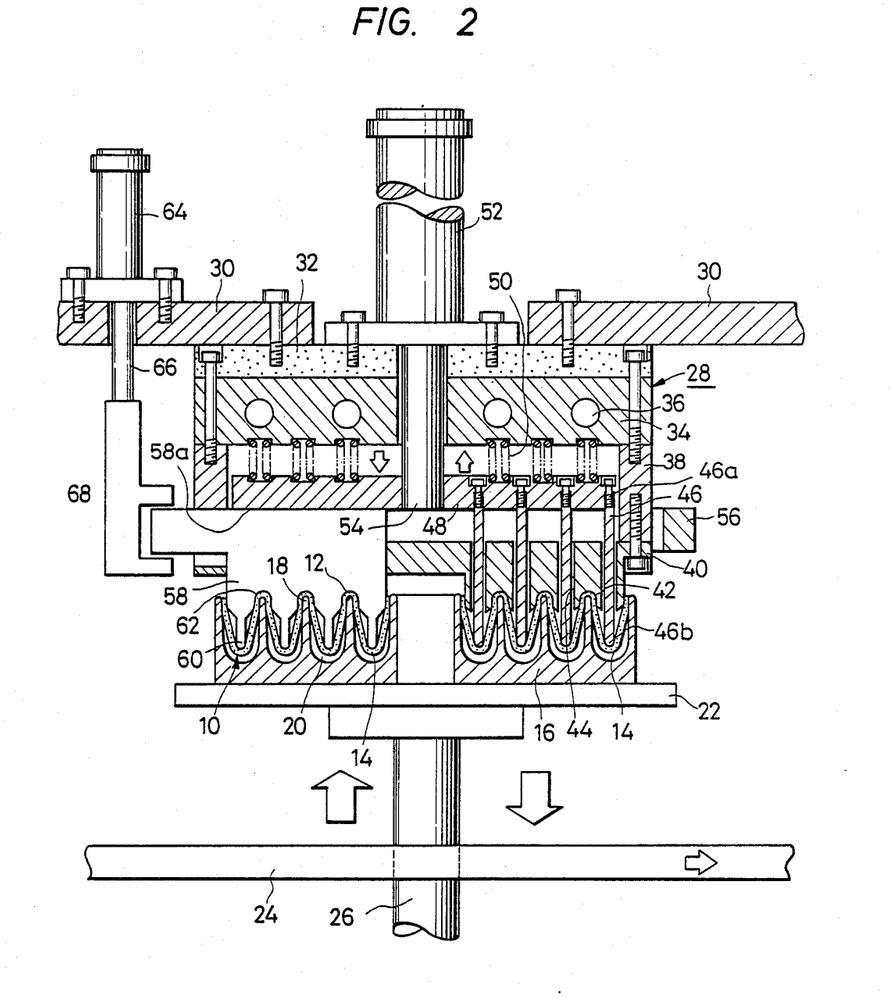
FIG. 2 is a vertical cross-sectional view of upper and lower molds.

As shown in FIG. 2, the upper mold 28 includes a heat-insulating support plate 32 fixed to a stationary base 30, and a heating plate 34 attached to the support plate 32 and accommodating heaters 36 therein. A disc suspension ring 38 is also attached to the support plate 32 with the heating plate 34 therebetween, and a circular plate or disc 40 is fixed to the lower end of the disc suspension ring 38.

Figure 3A:
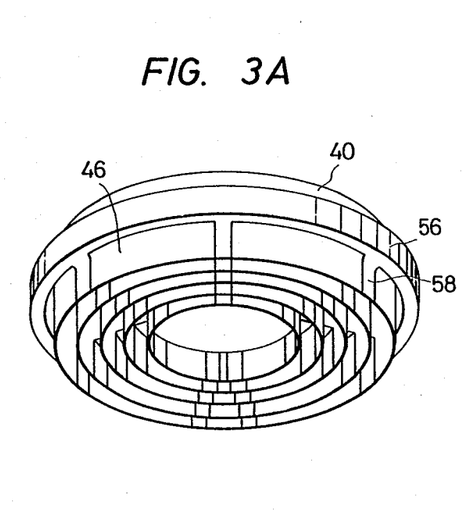
FIGS. 3A and 3B are perspective views showing ejecting operation.
Figure 3B:
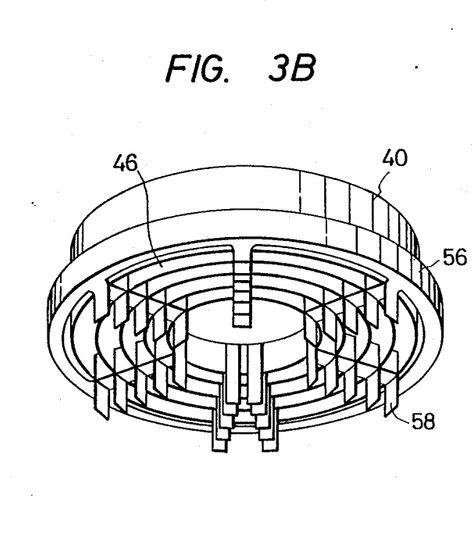

The disc 40 has a plurality of as many concentric grooves 42 as the number of the fins 18 of the lower mold 16, the grooves 42 being defined in a lower surface of the disc 40 in vertical alignment with the fins 18 of the lower mold 16. The grooves 42 can receive the respective fins 18 on which the peak folds 12 of the ring-shaped blank 10 are mounted, when the lower mold 16 is pressed upwardly against the disc 40. The disc 40 also has a plurality of arcuate slits 44 defined along concentric circular lines in the disc 40 between the grooves 42. Each circular slit group has seven circumferentially spaced arcuate slits 44 in the illustrated embodiment. A plurality of arcuate (as viewed from below the upper mold 28) projections or fins 46 are slidably inserted respectively in the slits 44 in vertical alignment with the grooves 20 of the lower mold 16. The fins 46 have upper ends 46a fixed to a fin height adjustment plate 48 disposed within the ring 38 and below the heating plate 34. As shown in FIGS. 3A and 3B, there are seven arcuate fins 46 in each circular fin group which are circumferentially spaced along a concentric circular line and disposed in corresponding slits 44.

The fin height adjustment plate 48 is normally urged to move downwardly by springs 50 disposed between the fin height adjustment plate 48 and the heating plate 34. The fin height adjustment plate 48 is centrally secured to the lower threaded end of a piston rod 54 of a height adjustment cylinder 52 fixedly mounted on the upper surface of the support plate 32. Dependent on the height of the folds of the ring-shaped blank 18 mounted on the lower mold 16, the extent to which the fins 46 project from the lower ends of the slits 44 can be adjusted by vertically moving the piston rod 54.

An ejector or knockout ring 56 is loosely fitted over the disc 40 and has a plurality of integral ejectors or knockouts 58 disposed in circumferentially spaced positions and extending radially toward the center of the disc 40. As shown in FIGS. 2 and 3B, each knockout 58 is of a narrow member having a plurality of fins 60 which are identical in cross section to the fins 46 and a plurality of grooves 62 which are positioned between the fins 60 and identical in shape to the grooves 42 of the disc 40. The knockout 58 has an upper end 58a held against the fin height adjustment plate 48. The fins 60 of the knockouts 58 are arcuate in shape and are slidably inserted respectively in slits defined circumferentially between the fins 46. In the illustrated embodiment, there are seven knockouts 58 which are integrally coupled by the ring 56. The fins 60 are omitted from illustration in FIGS. 3A and 3B. The knockout ring 56 is coupled to a coupling 68 on the distal end of a piston rod 66 of a knockout cylinder 64 mounted on the upper surface of the base 30. When the lifter cylinder 26 is operated to lower the lower mold 16 away from the upper mold 28, the knockout cylinder 64 is also actuated to lower the knockouts 58 in unison with the lower mold 16.

FIG. 3A shows the knockouts 58 retracted upwardly into the disc 40. FIG. 3B illustrates the knockouts 58 lowered out of the disc 40 to eject the shaped filter element when the lower mold 16 is moved downwardly away from the upper mold 28.

Figure 4A:
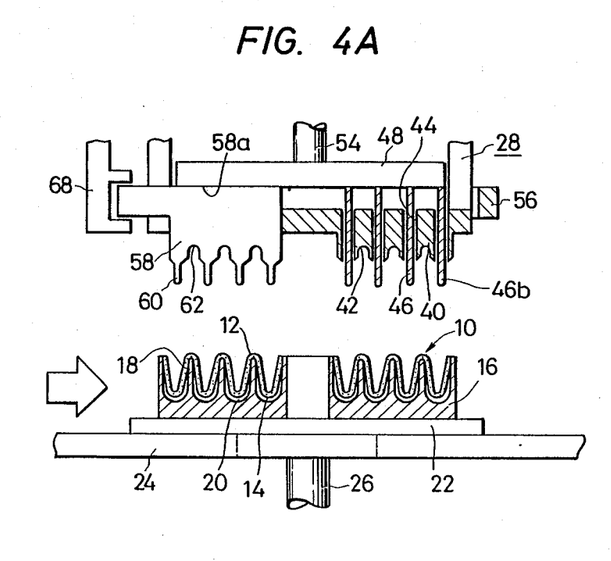
FIGS. 4A through 4D are cross-sectional views illustrating the manner in which a filter element blank is successively processed by the upper and lower molds.

A process of successively shaping the ring-shaped blank 10 in the shaping station with the upper and lower molds 28, 16 will hereinafter be described with reference to FIGS. 4A through 4D. The ring-shaped blank 10 is mounted on the lower mold 16 carried on the pallet 22, and then delivered by the conveyor 24 to a position directly below the upper mold 28, as shown in FIG. 4A. At this time, the fins 46 of the upper mold 28 are adjusted in height by the height adjustment cylinder 52 to match the height of the folds of the ring-shaped blank 10. The upper surfaces 58a of the knockouts 58 are held in contact with the lower surface of the fin height adjustment plate 48. The grooves 42 of the disc 40 and the grooves 62 of the knockouts 58 are registered with each other, and the tip ends 46 of the fins 46 and the tip ends of the fins 60 of the knockouts 58 are aligned with each other. The disc 40, the fins 46, and the knockouts 58 are bodily heated by the heating plate 34 up to a temperature for heat-setting the ring-shaped blank 10.

Figure 4B:
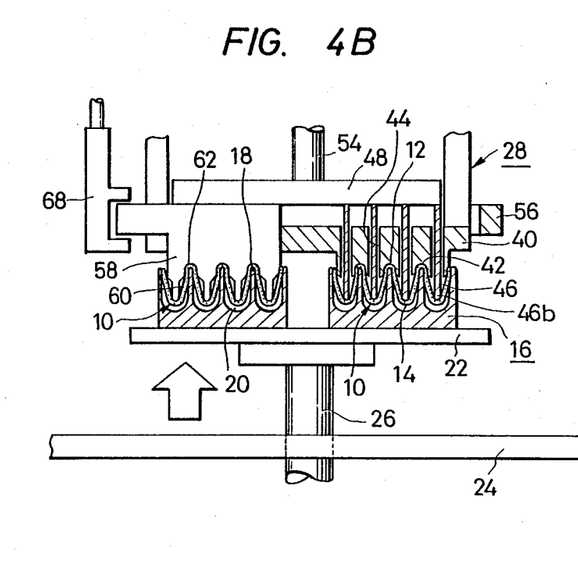
Figure 5:
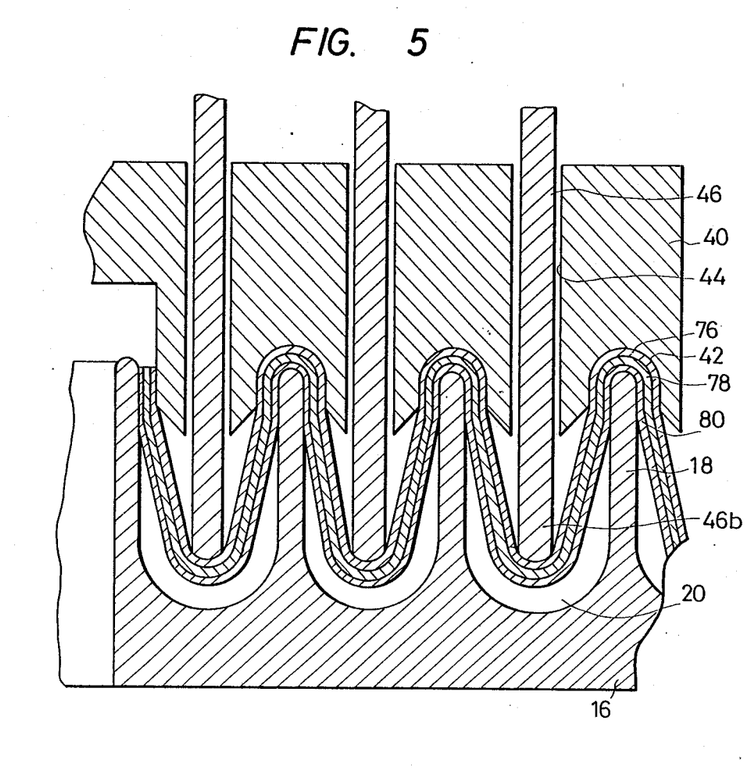
FIG. 5 is an enlarged fragmentary cross-sectional view of the filter element blank.

Then, the lifter cylinder 26 is elevated to press the lower mold 16 against the upper mold 28 as shown in FIG. 4B. The tip ends of the fins 18 of the lower mold 16 on which the peak folds 12 of the blank 10 are fitted respectively into the concentric grooves 42 of the disc 40, and the fins 46 of the upper mold 28 are inserted respectively into the valleys or grooves 14 of the blank 10, with the tip ends of the fins 46 pressing the bottoms of the valleys 14. Likewise, the peak folds 12 of the blank 10 are forced respectively into the grooves 62 of the knockouts 58 by the fins 18, and the fins 60 of the knockouts 58 are pressed against the bottoms of the valleys 14 of the blank 10. As shown in FIG. 5 at an enlarged scale, the filter element blank 10 is composed of a laminated structure comprising an upper dense layer 76, an intermediate layer 78, and a lower coarse layer 80. The dense layer 76 has a fiber structure which is most closely massed and intertwined, and hence is most resistant to deformation. Therefore, the filter element blank 10 has a density gradient in its axial direction. Since the dense layer 76 is positioned in direct contact with the heated disc 40, the fins 46, and the fins 60, it is well heated to shape or heat-set the peak folds 12 and the valley folds 14 to true concentric configuration while rectifying the angularly bent edges 12', 14' to smooth round surfaces.

Figure 4C:
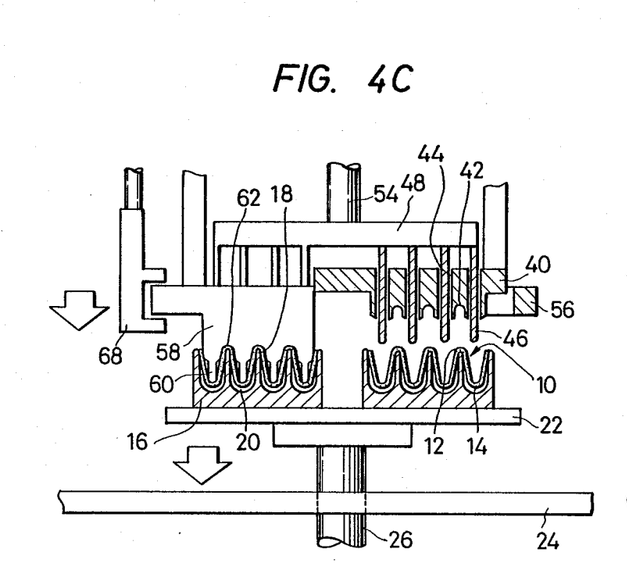

After the blank 10 has been heated for a prescribed period of time, e.g., about 5 seconds, under pressure between the upper mold 28 and the lower mold 16, the lifter cylinder 26 is lowered to displace the lower mold 16 away from the upper mold 28, as illustrated in FIG. 4C. At the same time, the knockout cylinder 64 is operated to lower the knockouts 58 in unison with the lower mold 16. The shaped filter element 10A on the lower mold 16 is thus ejected by the knockouts 58 and separated from the upper mold 28 without sticking thereto.

Figure 4D:
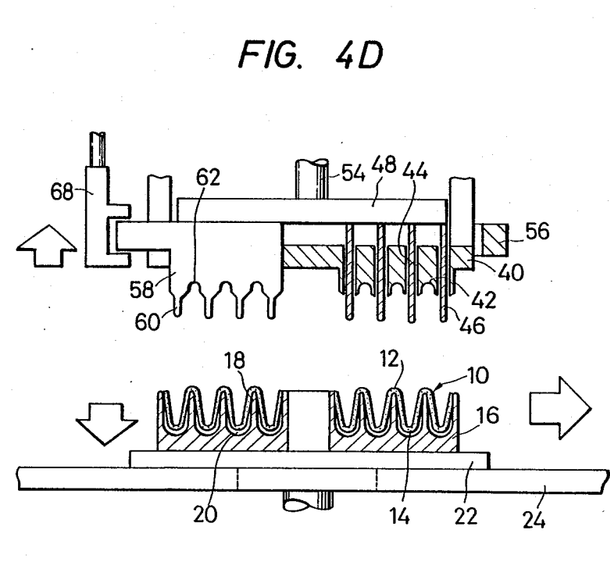

When the lower mold 16 is placed on the conveyor 24, the knockouts 58 are lifted back into the disc 40, and the lower mold 16 with the filter element 10A thereon is delivered to a next cooling station, as shown in FIG. 4D.

There are filter element blanks of different types that are to be shaped into filter elements. They can roughly be classified into those having different numbers of folds, and those having different heights of folds.

Filter element blanks of different numbers of folds can be shaped by one set of upper and lower molds insofar as the upper and lower molds have a maximum number of fins.

Figure 6A:
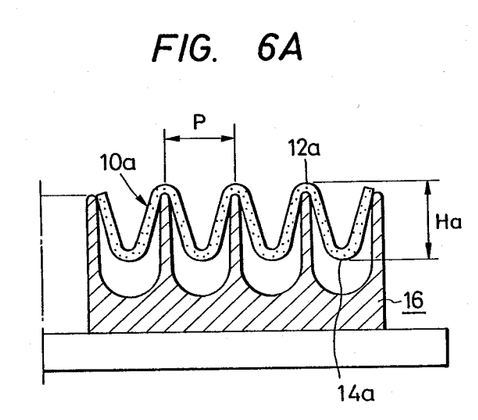
FIGS. 6A and 6B are cross-sectional views of filter element blanks of different peak heights mounted on the lower mold.
Figure 6B:
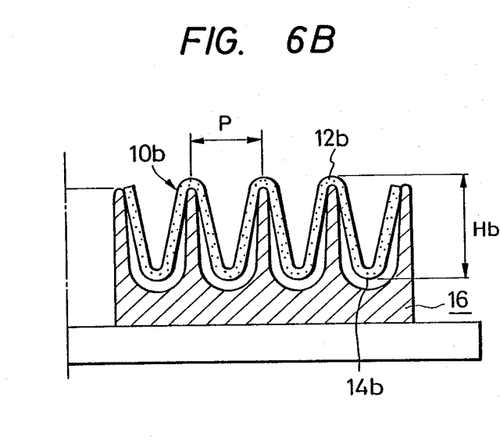

As illustrated in FIGS. 6A and 6B, ring-shaped filter element blanks 10a, 10b of different fold heights Ha, Hb between peak and valley folds 12a, 12b and 14a, 14b have the same fold-to-fold pitch P. Therefore, the upper mold 28 can process such blanks of different fold heights by adjusting the projection of the fins 46 with the height adjustment cylinder 52.

Figure 7A:
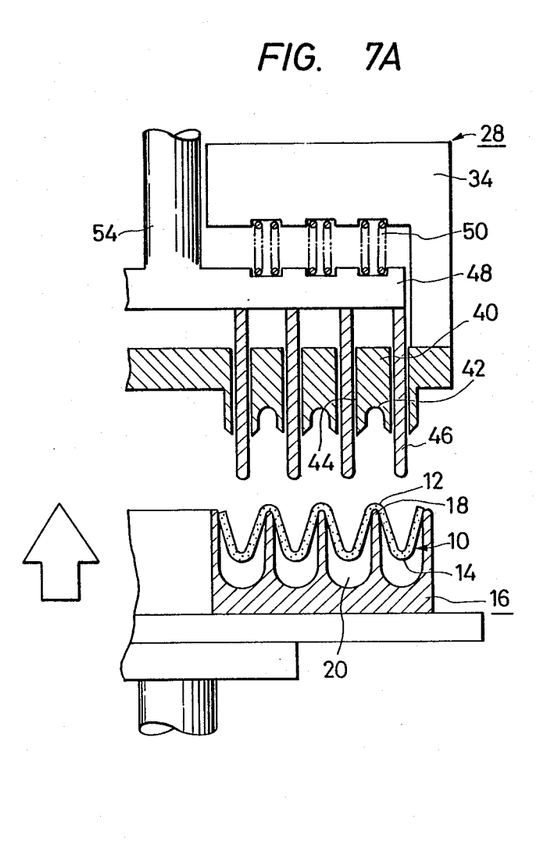
FIGS. 7A and 7B are cross-sectional views showing the manner in which fins of the upper mold slide when processing a filter element blank of a smaller peak height.
Figure 7B:
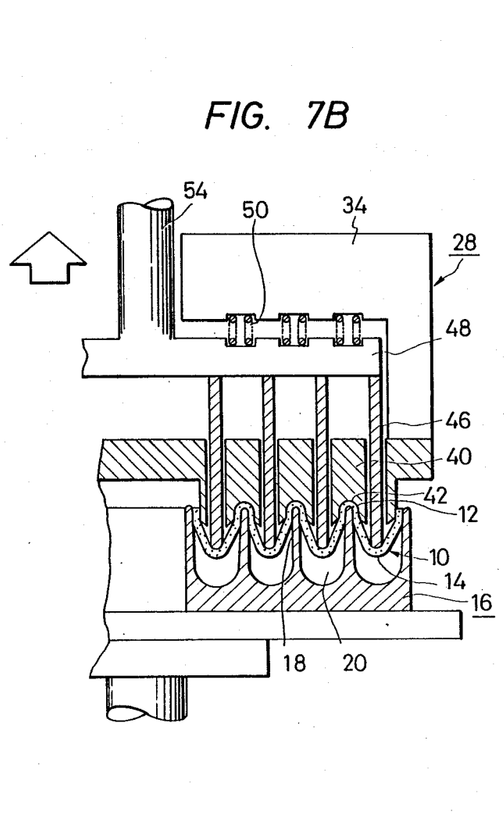

The fins 46 of the upper mold 28 are also automatically adjustable in height to accommodate a certain range of fold heights. More specifically, as shown in FIG. 7A, the fins 46 are previously adjusted in height to match the fold height of a ring-shaped filter element blank. After the blank has been shaped, another ring-shaped blank 10 of a smaller fold height is mounted on the lower mold 16. The lower mold 16 is lifted and pressed against the upper mold 28 with the blank 10 interposed therebetween. The fin height adjustment plate 48 is normally biased by the spring 50 to move downwardly. However, when the blank 10 is forced against the upper mold 28, the fins 46 are displaced upwardly by the blank 10 while compressing the springs 50, so that the peak folds 12 and the valley folds 14 of the blank 10 can neatly be shaped by the heat by the fins 18, 46, as shown in FIG. 7B. At this time, the knockouts 58 (not shown in FIGS. 7A and 7B) are also moved upwardly by the blank 10, displacing the grooves 62 of the knockouts 58 out of contact with the peak folds 12 of the blank 10. Therefore, those areas of the peak folds 12 which are out of contact with the knockouts 58 are not shaped under pressure. However, such non-contact areas of the peak folds 12 are limited to a small proportion and do not adversely affect the shaping of the entire blank 10. Consequently, the mold assembly can shape ring-shaped filter element blanks of different fold heights without operating the height adjustment cylinder 52 (FIG. 2) as long as such different fold heights are within the range in which the fin height adjustment plate 48 is vertically slidable against the resiliency of the springs 50.

The shaped filter element 10A is delivered from the shaping station at (B) in FIG. 1 to the cooling station at (C) in FIG. 1. The cooling station has an air supply duct 72 with an air blower 70 disposed in its upper end, and a discharge duct 74 located below the air supply duct 72 with the conveyor 24 therebetween. The filter element 10A that has been heat-set in the shaping station is cooled in the cooling station by cooling air supplied downwardly from the air blower 70 through the air supply duct 72 into the air discharge duct 74.

While the upper mold 28 is shown as being heated, and the lower mold 16 is shown as being pressable against the upper mold 28, the lower mold 16 may instead be heated, and the upper mold 28 may instead be pressed against the lower mold 16. The filter element blank may be of a single layer rather than a multiple-layer structure.

Although a certain preferred embodiment of the present invention has been shown and described in detail, it should be understood that various changes and modifications may be made therein without departing from the scope of the appended claims.

What is claimed is:

1. A method of forming a filter element, comprising the steps of:
    (a) providing a ring-shaped corrugated filter element blank having radially alternate peak and valley folds;
    (b) placing said ring-shaped blank on a first mold having as many first concentric projections as the number of the peak folds of said ring-shaped blank and as many first concentric grooves as the number of the valley folds of said ring-shaped blank, with said peak folds fitted respectively over said first projections and said valley folds fitted respectively in said first grooves;
    (c) preheating a second mold, said second mold being positioned upwardly of said first mold, said first mold being movable toward and pressable against said second mold for pressing said ring-shaped blank between said first and second molds;
    (d) pressing said ring-shaped blank between said first mold and said mold, said second mold having second projections lying along concentric lines for fitting respectively in said first grooves, said valley folds received between said second projections and said first grooves, and said second mold having second concentric grooves for receiving respectively said first projections with said peak folds fitted between said second grooves and said first projections;
    (e) heating said ring-shaped blank while it is being pressed between said first and second molds, thereby forming a ring-shaped filter element;
    (f) separating said first mold with said ring-shaped filter element thereon from said second mold;
    (g) delivering said first mold with said ring-shaped filter element thereon so as to be cooled; and
    (h) thereafter, cooling said ring-shaped filter element.

2. A method according to claim 1, further including the step of, between said placing step (b) and said heating step (e), delivering said first mold with said ring-shaped blank thereon to said heating step (d).

3. A method according to claim 1, wherein in said pressing step (d), said valley folds of said ring-shaped blank are pressed by said second projections of said second mold within said first grooves of said first mold, and said peak folds of said ring-shaped blank are pressed by said first projections of said first mold within said second grooves of said second mold.

4. A method according to claim 3, wherein said ring-shaped blank has a density gradient in an axial direction thereof.

5. A method according to claim 1, wherein said ring-shaped blank is formed from a filter element blank of a sectorial shape with said peak and valley folds extending along arcuate lines of said sectorial shape.

6. A method according to claim 1, wherein said cooling step (g) comprises the step of forcibly applying air directly to said ring-shaped filter element placed on said first mold.

7. A method according to claim 1, wherein said heating step (e) comprises the step of heating said peak and valley folds of said ring-shaped blank.

8. An apparatus for forming a filter element by heating a ring-shaped filter element blank having radially alternate peak and valley folds, said apparatus comprising:

a lower mold for placing said ring-shaped filter element blank having said radially alternate peak and valley folds upon said lower mold, said lower mold having as many first concentric projections as the number of the peak folds of said ring-shaped filter element blank and as many first concentric grooves as the number of the valley folds of said ring-shaped filter element blank, said first projections and grooves being alternately arranged;

an upper mold positioned upwardly of said lower mold, said upper mold having second projections lying along concentric lines and positioned in alignment with said first grooves, respectively, and said upper mold having second concentric grooves positioned in alignment with said first projections, respectively, said second projections and grooves being alternately arranged;

moving means for moving said lower and upper molds toward each other to engage said first projections with said second grooves and to engage said second projections with said first grooves thereby to press said ring-shaped filter element blank between said lower and upper molds, and for moving said lower and upper molds away from each other to bring said first projections out of said second grooves and to bring said second projections out of said first grooves;

knockout means, disposed within said upper mold, for moving said filter element away from said upper mold as said lower and upper mold are moved away from each other, said knockout means being movable toward said first projections and said first grooves of said lower mold as said lower and upper molds are moved away from each other;

electric heater means, disposed in said upper mold, for heating said second projections and grooves of the upper mold to heat said ring-shaped filter element blank while being pressed between said lower and upper molds, thereby forming a ring-shaped filter element; and lowering means for lowering said knockout means in conjunction with said lower mold as said lower and upper molds are moved away from each other by said moving means, thereby holding said ring-shaped filter element on said lower mold when said lower and upper molds are moved away from each other.

9. An apparatus according to claim 8, wherein said second projections have arcuate shapes, respectively, which are circumferentially spaced along each of said concentric lines, said knockout mechanism being disposed between the spaced arcuate second projections along the concentric lines.

10. An apparatus according to claim 9, wherein said knockout mechanism has grooves defined in one end thereof for receiving said first projections respectively therein and projections on said one end for engaging in said first grooves, respectively.

11. An apparatus according to claim 10, wherein said first projections, said second projections, and said projections of the knockout mechanism are in the form of fins.

12. An apparatus according to claim 8, wherein said upper mold has first and second plates, said first plate having said second grooves and a plurality of slits aligned with said second projections, respectively, and lying along concentric lines, said second projections being disposed respectively in said slits, said second projections having one ends projecting from said first plate toward said lower mold and opposite ends projecting from said first plate away from said first mold and fixed to said second plate.

13. An apparatus according to claim 12, wherein said second projections are movably disposed in said slits, respectively, further including adjustment means coupled to said second plate for moving said second projections through said slits to adjust the extent to which said one ends of the second projections project from said first plate toward said first mold.

14. An apparatus according to claim 8, further including adjustment means for adjusting the extent to which said second projections project toward said first mold.

15. An apparatus according to claim 8, further comprising cooling means for cooling the ring-shaped filter element after having been heated and formed between said lower and upper molds.

16. An apparatus according to claim 15, further comprising conveyor means for conveying said lower mold with said ring-shaped filter element blank placed thereon to a position in which the ring-shaped filter element blank is pressed between said lower and upper molds by said moving means, and for conveying said lower mold with said ring-shaped filter element placed thereon toward said cooling means after said ring-shaped filter element has been heated and formed between said lower and upper molds, and said ring-shaped filter element has been separated from said upper mold.

* * * * *